United States Patent [19]

Katsuya

[11] 4,006,528
[45] Feb. 8, 1977

[54] PORTABLE GRASS AND BUSH CUTTER WITH BRAKE AND CLUTCH

[75] Inventor: Kazunari Katsuya, Okayama, Japan
[73] Assignee: Kaaz Machinery Co. Ltd., Japan
[22] Filed: Nov. 5, 1975
[21] Appl. No.: 628,953
[30] Foreign Application Priority Data
Nov. 22, 1974 Japan .............................. 49-134546
Nov. 22, 1974 Japan ...................... 49-142516[U]
Mar. 29, 1975 Japan ......................... 50-42149[U]
[52] U.S. Cl. ................................... 30/276; 30/390; 192/17 R
[51] Int. Cl.² ........................................ B27G 19/02
[58] Field of Search ............ 30/264, 296 R, 166 R, 30/381, 382, 276, 240, 390; 188/166; 192/17 R

[56] References Cited
UNITED STATES PATENTS

| | | | |
|---|---|---|---|
| 2,519,936 | 8/1950 | Sayre | 30/276 X |
| 2,697,457 | 12/1954 | Lawrence | 30/296 X |
| 3,026,665 | 3/1962 | Hoff | 192/17 R |
| 3,776,331 | 12/1973 | Gustafsson | 30/381 |

Primary Examiner—Al Lawrence Smith
Assistant Examiner—J. C. Peters
Attorney, Agent, or Firm—Bierman & Bierman

[57] ABSTRACT

A brake device for use in a portable bush cutter having a construction in which the driving force of the engine is transmitted through a centrifugal clutch assembly to the drive shaft sheathed in the elongated main pipe, then changed in direction by a bevel gear means and further transmitted to the rotary blade. Said brake device is installed at a location between either the drive shaft or the rotary blade shaft and the centrifugal clutch assembly. This brake device comprises a brake drum and a brake shoe or brake band and is operated simultaneously with the engine throttle valve by a lever secured to the handle grip, so as to apply the brakes to the rotary blade without stopping the engine.

12 Claims, 10 Drawing Figures

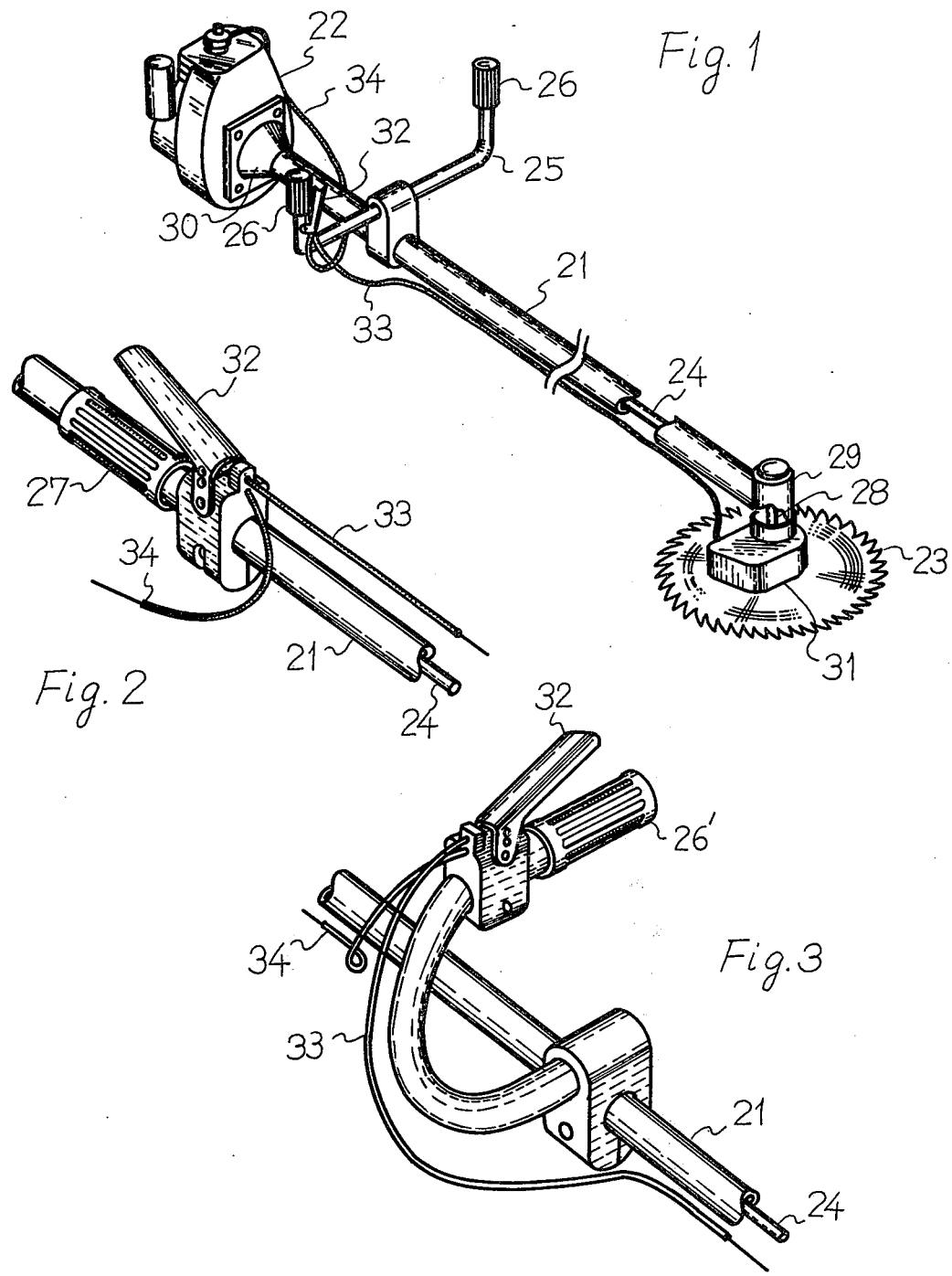

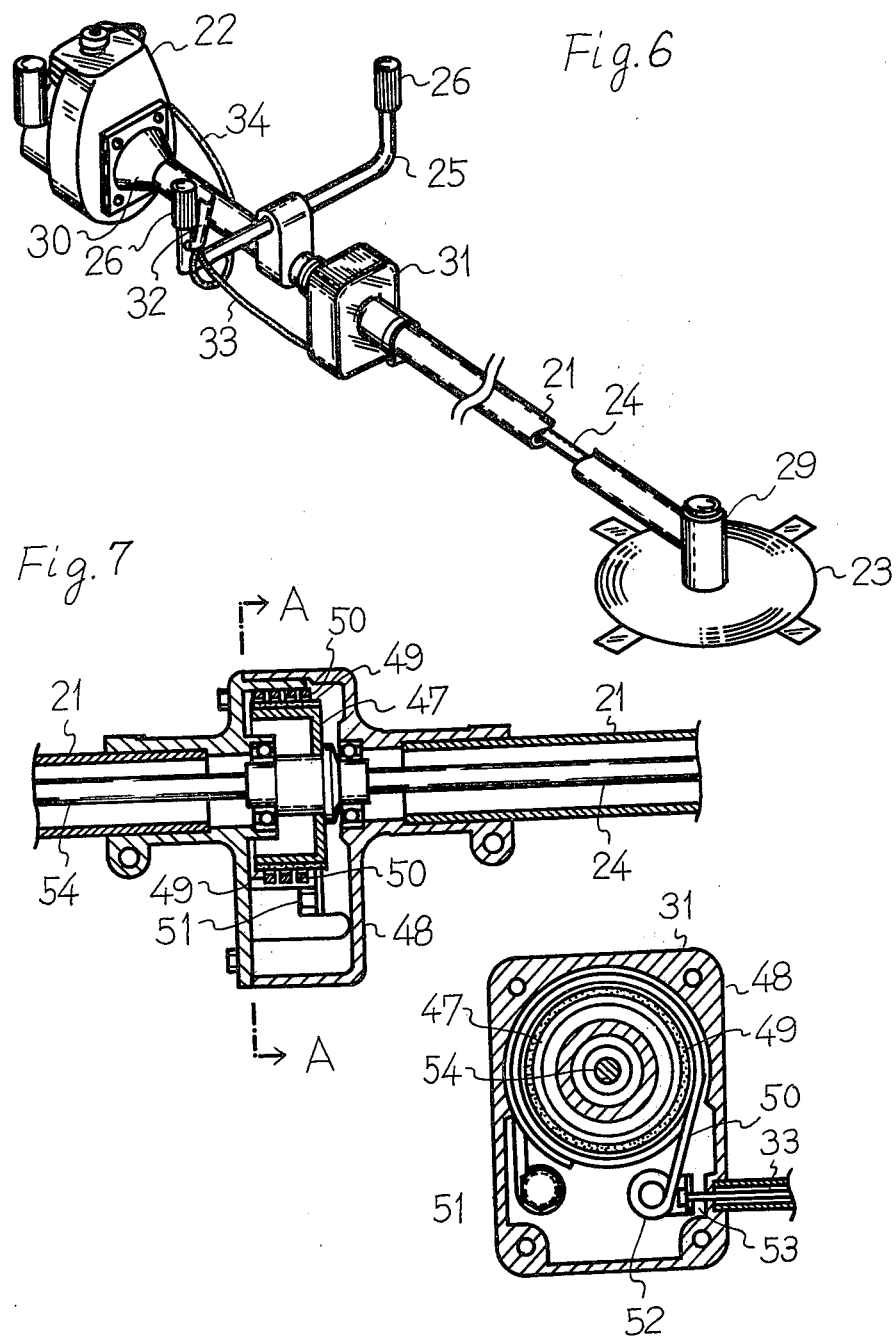

PORTABLE GRASS AND BUSH CUTTER WITH BRAKE AND CLUTCH

This invention relates to a brake device for portable grass and bush cutters having a rotary blade, and more particularly to a brake device of the type used in a portable grass and bush cutter having an engine and a centrifugal clutch assembly wherein said brake device and the throttle valve of the engine are controlled simultaneously by a lever mounted adjacent to the handle grip of the cutter so that the throttle valve of the engine is closed a moment earlier than the brakes are applied to the rotary blade to reduce engine speed, thus allowing one to quickly stop rotation of the rotary blade without shutting down the engine.

The conventional portable grass and bush cutters of the above type were equipped merely with a centrifugal clutch means having a construction in which clutch engagement is automatically released when the engine speed drops. To stop the rotary blade of the cutter, there was no alternative means but to control the throttle valve to limit fuel supply to the engine to reduce the engine speed. With simple throttle valve operating systems, the rotary blade would not come to a stop when the throttle valve was operated. A certain time lag between lever operation and rotary blade stoppage exists, making it impossible to attain instantaneous stopping of the rotary blade.

Also, the mode of use of such grass and bush cutter is widely diversified. For instance, the directional setting of the rotary blade with relation to the grass or bush to be cut, such as for example weeds, Italian ryegrass, brushwood or other cultivated plants such as rice, wheat, corn or sugar canes, is changed according to the difference in configuration of the ground where such grass or plants grow, e.g., according to whether such ground is flat or sloped. Further, in the case of cutting the branches of a standing tree, the operator must raise the rotary blade above his head. The direction of the rotary blade is also changed depending on whether the cutting is made rightwise or leftwise. Therefore, it is impossible to provide a safety cover over a certain specified portion along the circumference of the rotary blade, and hence the rotary blade is necessarily exposed along its full length, involving danger during the cutting work.

Thus, in the heretofore used grass and bush cutters of the said type, the rotary blade continues to rotate even if the operator's hands are accidentally separated from the handle grip of the machine when for instance he misses his footing to lose his physical balance or falls down while operating the machine, so that in such a case, there was danger of injuring the operator or other persons standing nearby.

It appears that a man is instinctively urged to quit his grasp on the handle grip when sensing danger. In accordance with this phenomenon, the brake means of the invention can automatically operate to stop rotation of the rotary blade immediately when the user lets go of the handle grip during cutting work, thereby precluding the danger of having the blade rotate in a danger situation.

Although there have been a few proposals on incorporation of a brake in mowers having a rotary blade, all of such proposals envisage setting a brake on the frame carrying the wheels, and there is no proposal to install a brake in a portable grass and bush cutter as set forth in the present invention. Further, the brakes of such previous proposals are different structurally from the device of the present invention. That is, such known brakes are either of a type used in a belt-driven power transmission system so that the braking action is provided by a roller engaged with the rotary blade shaft pulley while shutting off power transmission by loosening the belt (U.S. Pat. No. 3,581,481), or of a type comprising a first brake disc fixed on the rotary blade drive shaft, a first clutch disc fixed on the drive shaft from the motor, and a spool member mounted on said blade shaft between said first brake and clutch discs and including at its upper end a second clutch disc engageable with said first clutch disc and at its lower end a second brake disc engageable with said first brake disc, whereby the brake discs are disengaged when clutch discs are engaged and clutch discs are disengaged when brake discs are engaged (U.S. Pat. No. 3,871,159).

The brake device according to the present invention features combination of operations of a centrifugal clutch assembly and a brake unit and operative connection thereof with the throttle valve of the engine, whereby even if the brakes are applied to stop rotation of the rotary blade, the engine is allowed to continue its low speed running, eliminating necessity for restart. This brake device is thus very convenient for adaptation in portable types of grass and bush cutters and ensures safety in cutting operations.

The object of the present invention is to provide a brake device which is installed in a portable grass and bush cutter equipped with a centrifugal clutch unit but not with any sort of brake means, whereby when the brakes are applied, the throttle valve of the engine is closed to reduce engine speed with the result that the centrifugal clutch is disengaged to separate the engine driving system from the power transmission system for the rotary blade, allowing the engine alone to continue to run at low speed. It is to be noted that the brake device is provided in the transmission system forwardly of the centrifugal clutch so that the rotary blade can be stopped immediately when the operator senses any danger. The present device is also characterized in that both brake and throttle valve can be adjusted simultaneously, and that they are adjusted by a single adjusting lever set in the handle grip.

This adjusting lever is so designed that whenever the operator releases his hold on such lever, the brakes are applied immediately to stop rotation of the rotary blade, so that no danger is invited even if the operator should miss his footing and let go his hold on the handle grip or should fall down and drop the machine during work.

The brake device used in the present invention is simple in construction, merely comprising a brake drum and a brake shoe or brake band, so that it is low in cost, trouble free and easy to maintain.

FIG. 1 is a perspective view of a portable grass and bush cutter according to the present invention having a brake device mounted on the rotary blade shaft and adjacent to the rotary blade;

FIG. 2 is a partial perspective view of the cutter showing the portion where the brake device and a brake lever for operating the engine throttle valve are mounted to the main shaft grip;

FIG. 3 is also a partial perspective view showing a mode of fixing the brake lever to a one-handed handle grip;

FIG. 6 is a perspective view of a portable grass and bush cutter according to the present invention where the brake device is mounted to a portion of the drive shaft close to the handle mounted to the main pipe;

FIG. 7 is a longitudinal sectional view of the brake assembly;

FIG. 8 is a sectional view taken along the line A—A in FIG. 7, and

Figure 9:
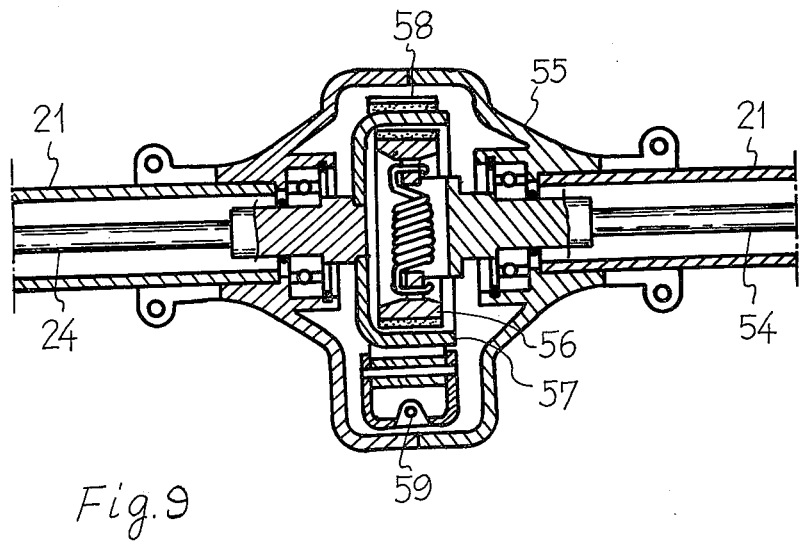
Figure 10:
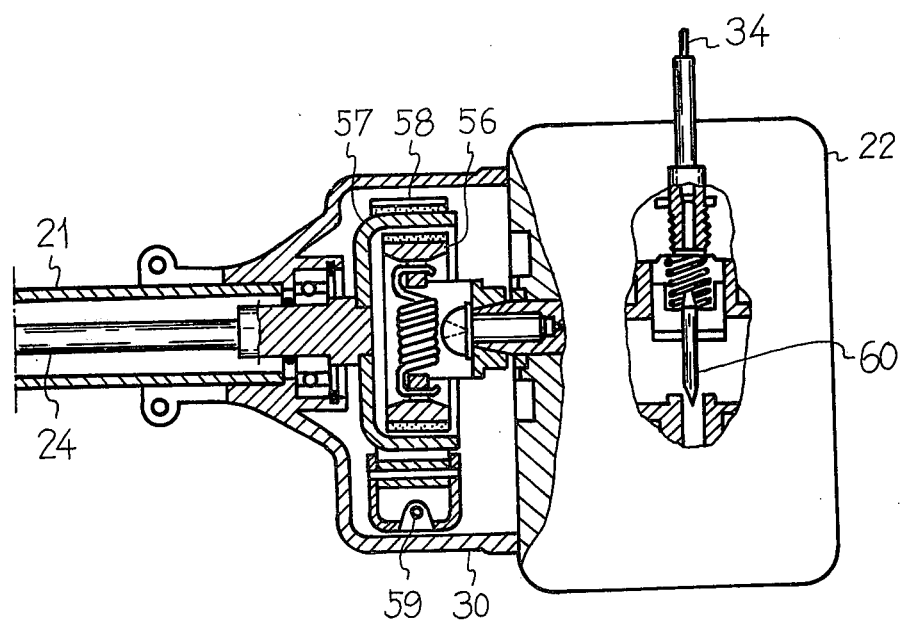

FIGS. 9 and 10, respectively are longitudinal sectional views of the brake-clutch unit where the brake device and centrifugal clutch device are assembled integrally, with FIG. 9 showing an example where said unit is installed on the drive shaft and FIG. 10 showing an example where said unit is mounted in a clutch case adjacent to the engine.

The drawings illustrate generally the basic construction of some preferred embodiments of the present invention.

As shown in FIG. 1, the portable grass and bush cutter of the present invention comprises an engine 22 mounted at the proximal end of the long main pipe 21 and a rotary blade 23 fixed at the distal end of said main pipe. The rotative force of the engine is transmitted to the rotary blade 23 by means of an elongated drive shaft 24 sheathed in the main pipe 21. This lengthy apparatus is carried by the operator with a shoulder band secured to a part of the main pipe close to the engine and is operated with the handle grips 26 at the ends of the handle 25 being grasped by the operator's hand. The handle shown in FIG. 1 is a double-handed type.

FIG. 2 shows a different embodiment in which a pipe grip 27 is provided directly in line with the main pipe 21. FIG. 3 shows a simple one-handled structure which is offset from the main pipe 21.

Referring again to FIG. 1, the shaft 28 of the rotary blade 23 is connected to the drive shaft 24 through a bevel gear housed in a gear case 29 so as to transmit power from the engine 22 to the rotary blade 23. A centrifugal clutch 56 (see FIGS. 9 and 10, respectively) is housed in a clutch case 30.

In the cutter shown in FIG. 1, a brake device 31 is installed on the rotary blade shaft 28. This brake is operated by a lever 32 which is provided either adjacent to one of the handle grips 26 of the handle 25 secured to the main pipe 21, or adjacent to the main pipe grip 27 as shown in FIG. 2, or adjacent to the main pipe grip 26' in FIG. 3. This lever 32 is connected to the brake device as well as to the throttle valve by independent flexible wires 33 and 34, respectively.

Figure 4:
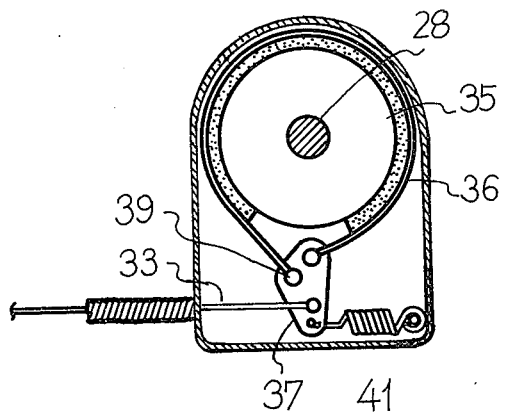
FIGS. 4 and 5 are sectional views showing the construction of the brake device of FIG. 1.
Figure 5:
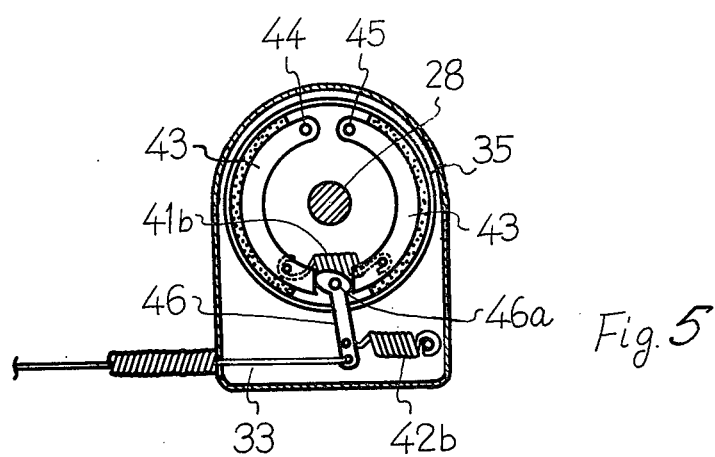

FIGS. 4 and 5 are sectional views showing the internal construction of various examples of brake devices 31, each having a brake drum 35 arranged for rotation integral with the rotary blade shaft 28. In the brake devices shown in FIGS. 4 and 5, an outer brake band 36 is provided outside of the brake drum 35 and a brake band fixing plate 37 is arranged pivotably about the pivot 30 with a tension spring 41 being fixed to the other end of said plate.

In the brake device of FIG. 4, the brakes remain off or disengaged when the brake wire 33 is being pulled, that is, when the operator is grasping the lever 32 together with the grip 26, and hence engine rotation is transmitted to the rotary blade. When the operator lets go his hold on the lever to let the brake wire 33 return, the brake band 36 tightens about the outer periphery of the brake drum 35 by the force of tension spring 41 to apply the braking force to the shaft 28.

In the brake device shown in FIG. 5, the braking operation is effectuated by the inner brake shoes 43 provided along the inner periphery of the brake drum 35. In this example, the bisected inner brake shoes 43 are supported at their pivoted ends 44 and 45 and a cam rod 46 is interposed between the other ends of said brake shoes so that said cam rod is pressed from its both sides by the brake shoes by means of a tension spring 41b, with a tension spring 42b and brake wire 33 being fixed to the other end of said cam rod 46 as shown. The cam rod is pivotable on pivot 46a. If the cam rod is shaped as shown in FIG. 5, the brakes are applied when the cam rod 46 is directed to the left in the drawing, that is, when the brake wire 33 is slackened to let the brake shoes 43 press against the inner periphery of the brake drum 35. The shape of this cam rod 46 may be changed such that the brakes are applied when the brake wire 33 is pulled tight.

In each of the foregoing examples, the brake device is mounted on the rotary blade shaft 28 of the machine, but the brake device may be set at any desired portion of the drive shaft 24 sheathed in the long main pipe or at the location of the centrifugal clutch assembly. Such examples are illustrated in FIGS. 6 to 10, respectively of the accompanying drawings.

The brake device is mounted either on the drive shaft or at a suitable portion of the clutch drum. When mounted on the drive shaft 24, any position on said shaft between the clutch drum and bevel gear may be selected, but it is most preferred to select a position close to the handle 25 as shown in FIG. 6. If this position is selected, it is possible to reduce the length of the brake wire 33 connecting the lever 32 of the handle grip 26 to the brake 31. Also, as this position is close to the centroid of the machine, positional deviation of the centroid caused by installation of the brake device can be minimized.

Although the brake device to be installed on the drive shaft 24 may be of the construction such as shown in FIGS. 4 and 5, it is more preferable to use the brake device having the construction shown in FIGS. 7 and 8, respectively as such construction provides a stronger braking force. The brake device may be set either independently as discussed above or in combination with the centrifugal clutch assembly as shown in FIGS. 9 and 10, respectively. These examples are described in further detail hereinbelow.

FIG. 7 illustrates sectionally an example where the brake device is installed on the drive shaft 24. In this example, the brake drum 47 fixed to the drive shaft 24 is placed in the brake housing 48 and the brake is mounted outside of the brake drum 47. The brake device may consist of an ordinary brake band and brake shoe combination, but preferably, as shown in FIG. 7 and FIG. 8, a brake lining 49 with high frictional force characteristics is fixed to the outer periphery of the brake drum 47 and a brake band 50 formed from a coil spring is disposed outside thereof, with one end of said brake band being adapted to act as fixed end 51 and the other end as movable end 52, so that the brakes may be applied at any time. Also, a variable space 53 is provided between the movable end 51 and housing 48 so that when the brake wire 33 is pulled the coil spring, normally tight against the brake lining, loosens to disengage the brakes.

FIG. 9 shows another example where a clutch is provided in combination with the brake unit of FIG. 7 to constitute a clutch-brake assembly. The engine shaft 54 is extended from the right side in the drawing to a point halfway of the main pipe 21, and the clutch and brake are integrated at the portion connected to the drive shaft 24 and contained in the clutch-brake housing 55. In this case, a conventional centrifugal clutch 56 is mounted on the engine shaft 54 and the clutch-brake drum 57 is fixed on the side of the drive shaft 24, that is, on the side of the rotary blade 23, while placing around said drum 57 a brake band 58 and a brake wire engaging plate 59 which operates said brake band.

FIG. 10 shows the final example in which the brake mechanism is mounted in combination with the clutch assembly in the clutch case 30 directly connected to the engine 22. The main structural elements of this mechanism are the centrifugal clutch 56, a clutch-brake drum 57 and brake band 58 as in the case of the example of FIG. 9.

In addition to the brake mechanisms shown in FIGS. 4, 5 and FIGS. 7 to 10, it is also possible to employ a magnetic brake system for achieving the object of the present invention.

For operation of the brake device, lever 32 is secured to the handle grip 26 or the main pipe grip 27 as shown in FIGS. 1 to 3 and FIG. 6, and when operating the machine, the operator grasps this lever 32 together with the grip, whereby the brake stays off and the rotary blade continues to rotate, but should the operator's hand be separated from the grip 26 for some reason or other, said lever 32 automatically springs back to its normal position to apply the brakes. Also, in some types of machines such as shown in FIG. 3, the handle may be omitted while providing the grip on a suitable part of the main pipe. In this case, it is recommended to set the brake lever on the main pipe grip.

It is undesirable to suddenly brake the drive shaft 24 which is rotating at high speed as such sudden braking transmits undesirable shock to the engine 22, drive shaft 24 and other parts. Therefore, in the present invention, there is also provided a mechanism for constricting the engine throttle valve 60 simultaneously with or a moment earlier than the braking operation to let the engine run at low speed. The type of mechanism is conventional, is set in the lever 32 and adjusted by a throttle wire 34.

This operating method is one of the features of the present invention. According to this method, when the brakes are applied the rotary blade 23 is immediately stopped to ensure safety while the engine is simultaneously slowed down, and as the centrifugal clutch 56 is disengaged, the engine continues to run at a low speed. Thus, the engine is not completely stopped, so that if the brake is operated for purposes other than emergency, such as when changing to another working site or for a break, the next round of work can be started immediately with no need to restart the engine.

What is claimed is:

1. A portable grass and bush cutter having a drive shaft, an engine and a rotary blade, bevel gear means for connecting said rotary blade to said drive shaft, means for supplying fuel to said engine, a centrifugal clutch for connecting said engine to said drive shaft, and friction brake means operable to quickly stop rotation of said rotary blade, means for carrying said grass and bush cutter in use and a control lever mounted in cooperation with said means for carrying the grass and bush cutter, two flexible wire means connected to said lever, one of said flexible wires being connected to said means for supplying fuel to said engine, friction brake actuating means for actuating the brake, the other of said flexible wires being connected to the said friction brake actuating means, means for urging said lever into a first position in which the fuel supply to the engine is substantially shut off and in which said friction brake actuating means actuates said brake, said lever being moveable into operating position by the operator to permit fuel flow to the engine and to release the brake, said lever being automatically returnable to the first position upon release of the lever by the operator.

2. The apparatus according to claim 1 wherein said brake means comprises a drum and friction means adapted to contact said drum upon actuation of said brake means.

3. The apparatus according to claim 2 wherein said friction means comprises a brake band normally loosely held on said drum, and means for tightening said brake band on said drum upon actuation of said brake means.

4. The apparatus according to claim 2 wherein said brake means comprises a plurality of brake shoes mounted internally of said brake drum, and means for expanding said brake shoes to frictionally engage said drum.

5. The apparatus according to claim 4 wherein said means for expanding said shoes comprises a cam rod pivotally mounted between adjacent ends of said brake shoes, said cam rod being pivotable to contact the said ends of said shoes and force the shoes into engagement with the said drum.

6. The apparatus according to claim 2 wherein said brake means is mounted adjacent said rotary blade.

7. The apparatus according to claim 2 further comprising a clutch case, said centrifugal clutch and brake means being mounted in said clutch case.

8. The apparatus according to claim 7 wherein said centrifugal clutch comprises a clutch drum and drum engaging means mounted internally of said clutch drum, said brake means comprising a brake band adapted to contact the outer periphery of said clutch drum.

9. The apparatus according to claim 1 further comprising a pivotable plate mounted in said brake means, a brake band mounted on said drum, the ends of said brake band being connected to said pivotable plate, said flexible wire being connected to said pivotable plate and adapted to pivot said plate in response to movement of said lever to actuate said brake means.

10. The apparatus according to claim 7 wherein said clutch case is mounted between said engine and said bevel gear means.

11. The apparatus according to claim 8 wherein one end of said brake band is fixedly mounted to said case and the other end of said brake band is movable to loosen the grip of said brake band on said drum, said brake actuating means comprising a flexible wire connected to said free end, a handle and a pivotable lever mounted on said handle, the flexible wire also being connected to said pivotable lever.

12. The apparatus according to claim 2 wherein said brake means is mounted between said centrifugal clutch and said bevel gear means.

* * * * *